United States Patent
Khoshnevisan et al.

(10) Patent No.: US 12,335,978 B2
(45) Date of Patent: *Jun. 17, 2025

(54) PRUNING RULES FOR DCI REPETITION

(71) Applicant: QUALCOMM Incorporated, San Diego, CA (US)

(72) Inventors: Mostafa Khoshnevisan, San Diego, CA (US); Xiaoxia Zhang, San Diego, CA (US); Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/415,389

(22) Filed: Jan. 17, 2024

(65) Prior Publication Data
US 2024/0155631 A1    May 9, 2024

Related U.S. Application Data

(63) Continuation of application No. 17/647,124, filed on Jan. 5, 2022, now Pat. No. 11,902,993, which is a continuation of application No. 16/712,949, filed on Dec. 12, 2019, now Pat. No. 11,229,045.

(60) Provisional application No. 62/780,124, filed on Dec. 14, 2018.

(51) Int. Cl.
*H04W 72/23*     (2023.01)
*H04W 72/044*    (2023.01)

(52) U.S. Cl.
CPC ......... *H04W 72/23* (2023.01); *H04W 72/044* (2013.01)

(58) Field of Classification Search
CPC .............................. H04W 72/044; H04W 72/23

USPC ......................................................... 370/330
See application file for complete search history.

(56) References Cited

U.S. PATENT DOCUMENTS

| 11,229,045 B2* | 1/2022 | Khoshnevisan .... H04W 72/044 |
| 11,902,993 B2* | 2/2024 | Khoshnevisan ...... H04W 72/23 |
| 2013/0301543 A1 | 11/2013 | Eriksson et al. |
| 2015/0003301 A1 | 1/2015 | He et al. |

(Continued)

FOREIGN PATENT DOCUMENTS

| CN | 105594139 A | 5/2016 |
| CN | 107079436 A | 8/2017 |

(Continued)

OTHER PUBLICATIONS

Intel Corporation: "Layer 1 Enhancements for eURLLC", R1-1810785, 3GPP TSG RAN WG1 Meeting #94b, Intel-EURLLC L1 Enhancements_Final, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 29, 2018, XP051518190, 12 Pages, PUSCH enhancements, p. 5, paragraph 4-p. 7, The Whole Document.

(Continued)

*Primary Examiner* — Peter G Solinsky
(74) *Attorney, Agent, or Firm* — Patterson+ Sheridan, L.L.P.

(57) ABSTRACT

Certain aspects of the present disclosure provide techniques for utilizing and processing repeated DCI transmissions that schedule common uplink or downlink transmissions. The techniques allow a UE to decide which repeated DCI to use for determining resources for the uplink or downlink transmissions.

29 Claims, 11 Drawing Sheets

(56) References Cited

U.S. PATENT DOCUMENTS

| | | |
|---|---|---|
| 2015/0358986 A1 | 12/2015 | Yang et al. |
| 2016/0142981 A1 | 5/2016 | Yi et al. |
| 2017/0273056 A1 | 9/2017 | Papasakellariou |
| 2018/0123765 A1 | 5/2018 | Cao et al. |
| 2019/0020506 A1 | 1/2019 | Cheng et al. |
| 2019/0098614 A1 | 3/2019 | Deng et al. |
| 2019/0150124 A1 | 5/2019 | Nogami et al. |
| 2019/0334688 A1 | 10/2019 | Kwak et al. |
| 2019/0357238 A1 | 11/2019 | Zhou et al. |
| 2020/0053757 A1 | 2/2020 | Bagheri et al. |
| 2020/0196346 A1 | 6/2020 | Khoshnevisan et al. |
| 2020/0229216 A1 | 7/2020 | Zhu |
| 2020/0382247 A1 | 12/2020 | Kwak et al. |
| 2020/0383061 A1 | 12/2020 | Yang et al. |
| 2021/0091988 A1 | 3/2021 | Papasakellariou |
| 2021/0144700 A1 | 5/2021 | Lee et al. |
| 2021/0152314 A1 | 5/2021 | Shen et al. |
| 2022/0132552 A1 | 4/2022 | Khoshnevisan et al. |

FOREIGN PATENT DOCUMENTS

| | | |
|---|---|---|
| CN | 107580797 A | 1/2018 |
| EP | 3281466 A1 | 2/2018 |
| WO | 2016161618 A1 | 10/2016 |
| WO | 2018175596 A1 | 9/2018 |
| WO | 2019027262 A1 | 2/2019 |

OTHER PUBLICATIONS

Intel Corporation: "On NR PDCCH Repetitions for URLLC", 3GPP Draft; R1-1804741 Intel-PDCCH_Repetitions, 3rd Generation Partnership Project (3GPP), Mobile Competence Centre ; 650, Route Des Lucioles ; F-06921 Sophia-Antipolis Cedex ; France, vol. RAN WG1, Sanya, China; Apr. 16, 2018-Apr. 20, 2018, Apr. 15, 2018 (Apr. 15, 2018), XP051427008, 8 Pages, PDCCH Time-Domain Repetition; p. 3-p. 5.

International Preliminary Report on Patentability—PCT/US2019/066344—The International Bureau of WIPO—Geneva, Switzerland—Jun. 24, 2021.

International Search Report and Written Opinion—PCT/US2019/066344—ISA/EPO—Mar. 23, 2020.

Sequans: "PDCCH Enhancements for URLLC", 3GPP Draft; R1-1813538, 3rd Generation Partnership Project (3GPP), Mobile Competence Centre; 650, Route Des Lucioles ; F-06921 Sophia-Antipolis Cedex; France, vol. RAN WG1, No Spokane, USA; Nov. 12, 2018-Nov. 16, 2018, Nov. 11, 2018 (Nov. 11, 2018 ), XP051555593, 5 Pages, Discussion; p. 1, paragraph 2 PDCCH repetition; p. 3, paragraph 2.2-p. 5.

Sony: "L1 Enhancement on PDCCH for URLLC", 3GPP Draft; R1-1812742- REL-16 URLLC-PDCCH V04, 3rd Generation Partnership Project (3GPP), Mobile Competence Centre ; 650, Route Des Lucioles ; F-06921 Sophia-Antipolis Cedex; France, vol. RAN WG1, No. Spokane, USA; Nov. 12, 2018-Nov. 16, 2018, Nov. 11, 2018 (Nov. 11, 2018), XP051554700, 6 Pages, PDCCH Repetitions; p. 2, paragraph 2.2-p. 3.

Taiwan Search Report—108145744—TIPO—May 4, 2023.

Huawei, et al., "PDCCH Repetition for URLLC", 3GPP TSG RAN WG1 Meeting #95, R1-1813670, Spokane, USA, Nov. 12, 2018-Nov. 16, 2018, Nov. 3, 2018, 3 Pages.

Panasonic: "On NR URLLC L1 Enhancements", 3GPP TSG RAN WG1 Meeting #94bis, R1-1810474, Chengdu, China, Oct. 8, 2018-Oct. 12, 2018, Sep. 28, 2018, 9 pages.

Qualcomm Incorporated: "Multi-TRP Enhancements", 3GPP TSG-RAN WG1 Meeting #95, R1-1813442, Spokane, WA, USA, Nov. 12, 2018-Nov. 16, 2018, Nov. 16, 2018, pp. 1-20, Server Release Date Nov. 3, 2018.

* cited by examiner

PRUNING RULES FOR DCI REPETITION

PRIORITY CLAIM(S)

This application is a continuation of U.S. patent application Ser. No. 17/647,124, filed Jan. 5, 2022, which is a continuation of U.S. patent application Ser. No. 16/712,949, filed Dec. 12, 2019 (U.S. Pat. No. 11,229,045 as issued Jan. 18, 2022), which claims priority to and the benefit of U.S. Provisional Application No. 62/780,124, filed on Dec. 14, 2018, the entire contents of each of which are expressly incorporated by reference as if fully set forth below and for all applicable purposes.

FIELD OF THE DISCLOSURE

Aspects of the present disclosure relate to wireless communications, and more particularly, to techniques for processing transmissions scheduled with repeated downlink control information transmissions (DCIs).

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment (UE). The method generally includes detecting at least first downlink control information (DCI) and second DCI that both indicate same or similar scheduling information for a common uplink data transmission or a downlink data transmission, selecting at least one of the first or second DCI to use for determining scheduling parameters to use for the uplink data transmission, or for reception of the downlink data transmission, or for an uplink control information (UCI) transmission to provide feedback for the downlink data transmission, and utilizing the scheduling parameters to at least one of process the DL data transmission or send the uplink data transmission or UCI transmission.

Certain aspects provide a method for wireless communication by a network entity. The method generally includes transmitting at least first downlink control information (DCI) and second DCI that both indicate same or similar scheduling information for a common uplink or downlink transmission, determining, based on the first and second DCI, first and second resources to monitor for the uplink transmission or for an uplink control information (UCI) transmission that provides feedback for the downlink transmission, and monitoring the first and second resources for the uplink transmission or UCI transmission.

Certain aspects provide means for, apparatus, and/or computer readable medium having computer executable code stored thereon, for techniques described herein for processing DCI for multi-TRP transmissions.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
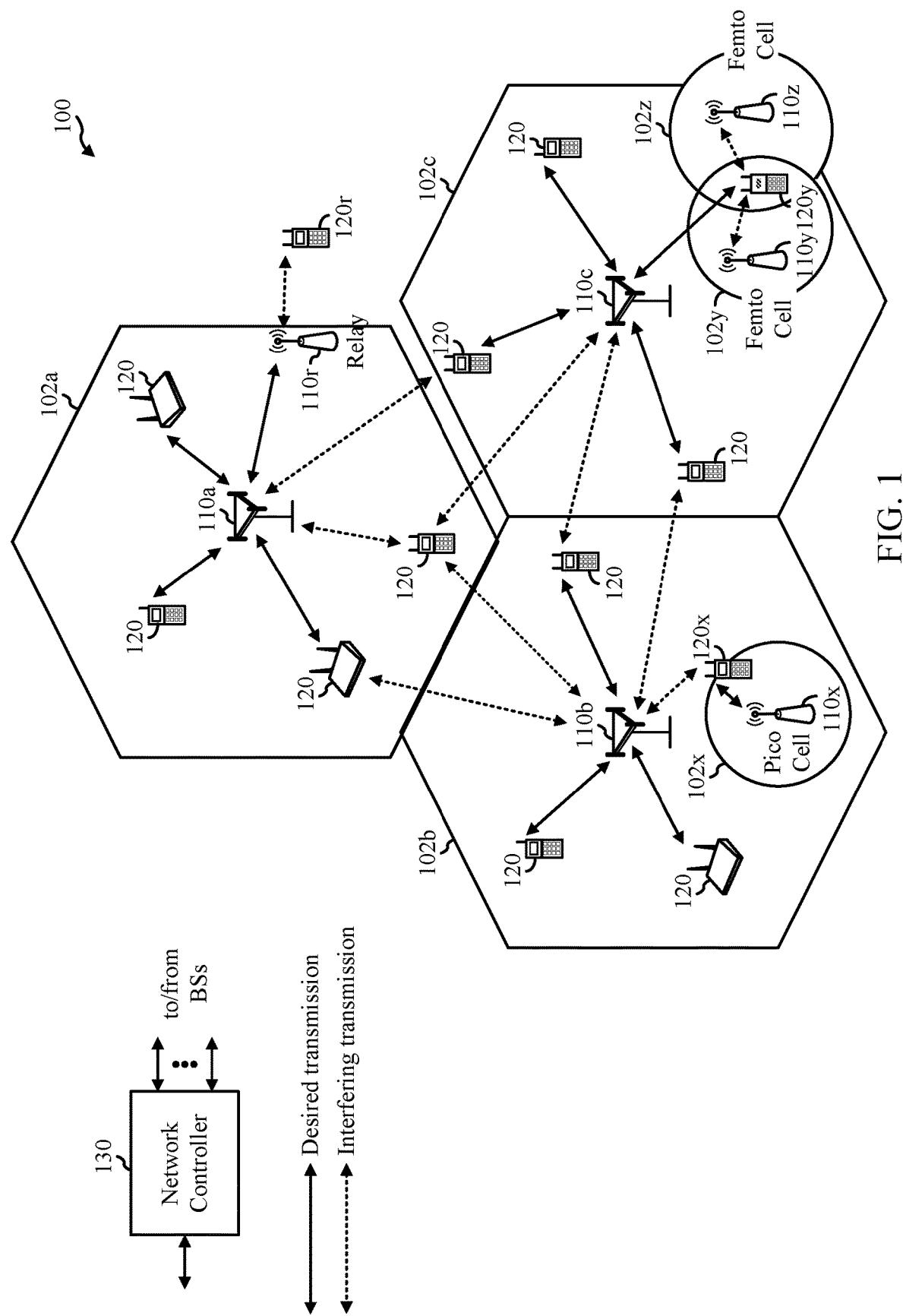
FIG. 1 is a block diagram conceptually illustrating an example telecommunications system, in accordance with certain aspects of the present disclosure.

Aspects of the present disclosure provide apparatus, methods, processing systems, and computer readable mediums for processing transmissions with multiple (repeated) downlink control information (DCI) transmissions. The techniques may be implemented in wireless systems in which any type of network entity (gNB or transmission reception points TRPs) uses repeated DCIs for scheduling transmissions, in order to enhance reliability.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, BSs 110 may perform operations 900 of FIG. 9 as part of a multiple transmission reception point (multi-TRP) session with a UE 120. In some cases, perform operations 800 of FIG. 8 to process multiple (repeated) DCI received during the session.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink A finely dashed line with double arrows indicates interfering transmissions between a UE and a BS.

Figure 2:
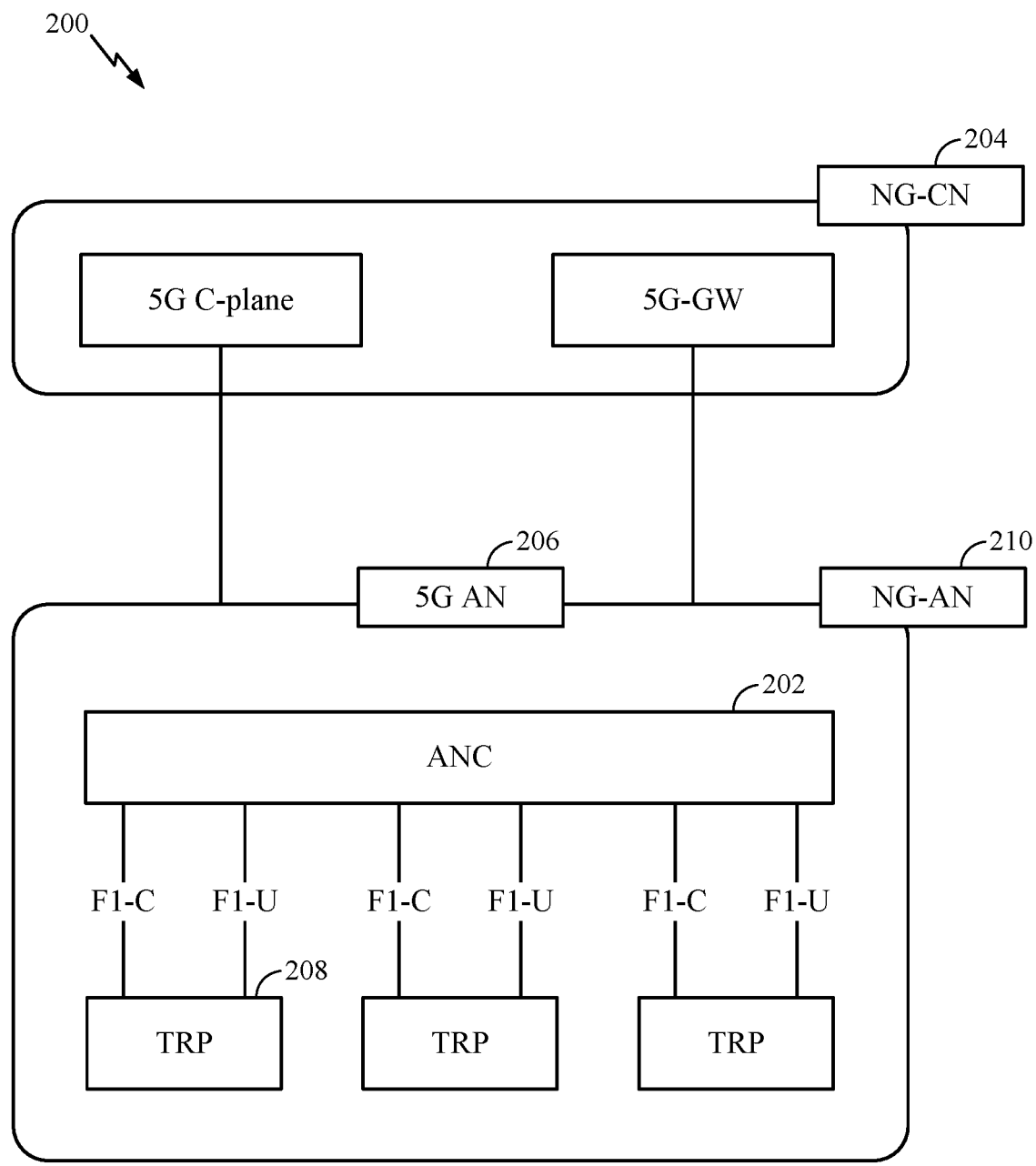
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
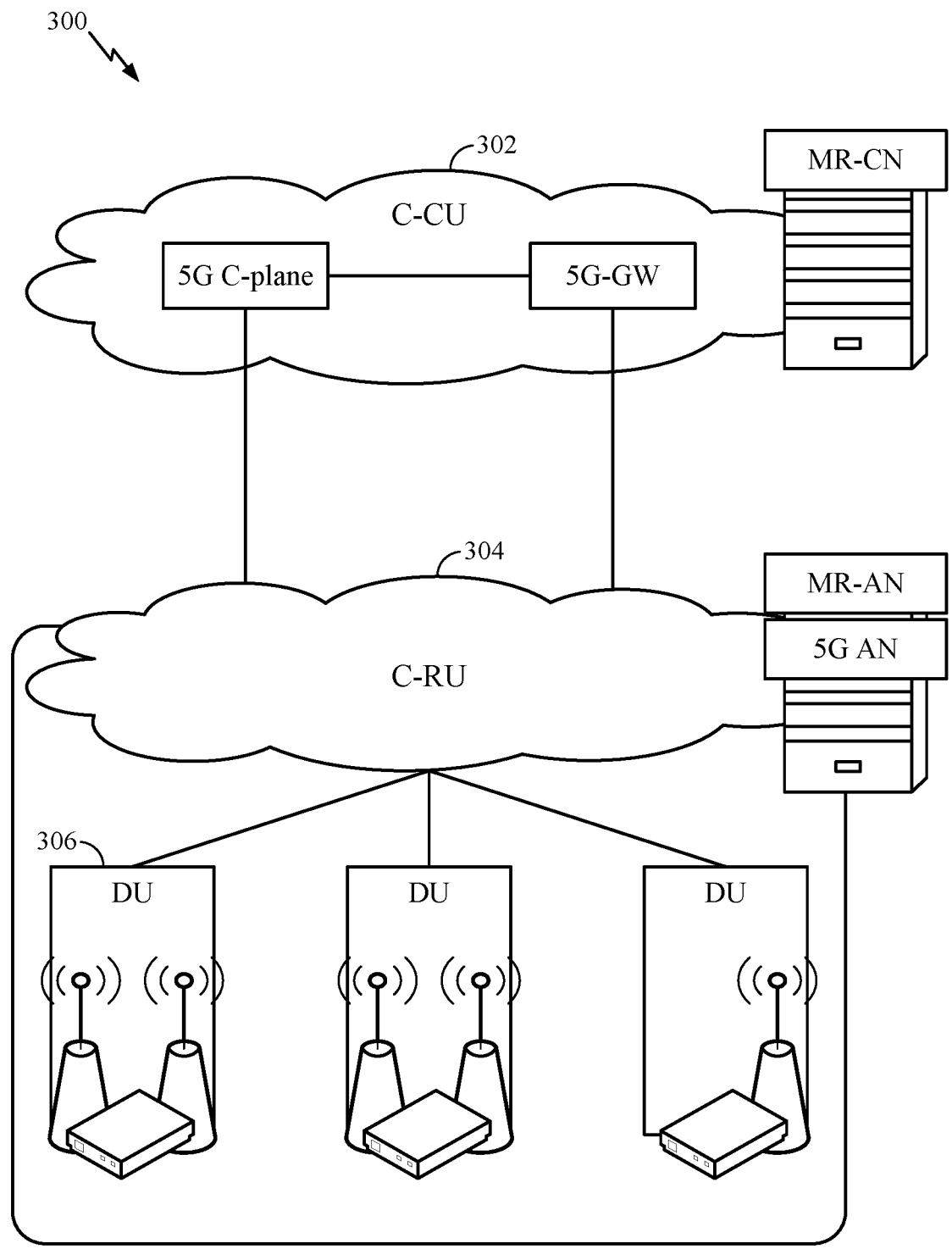
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
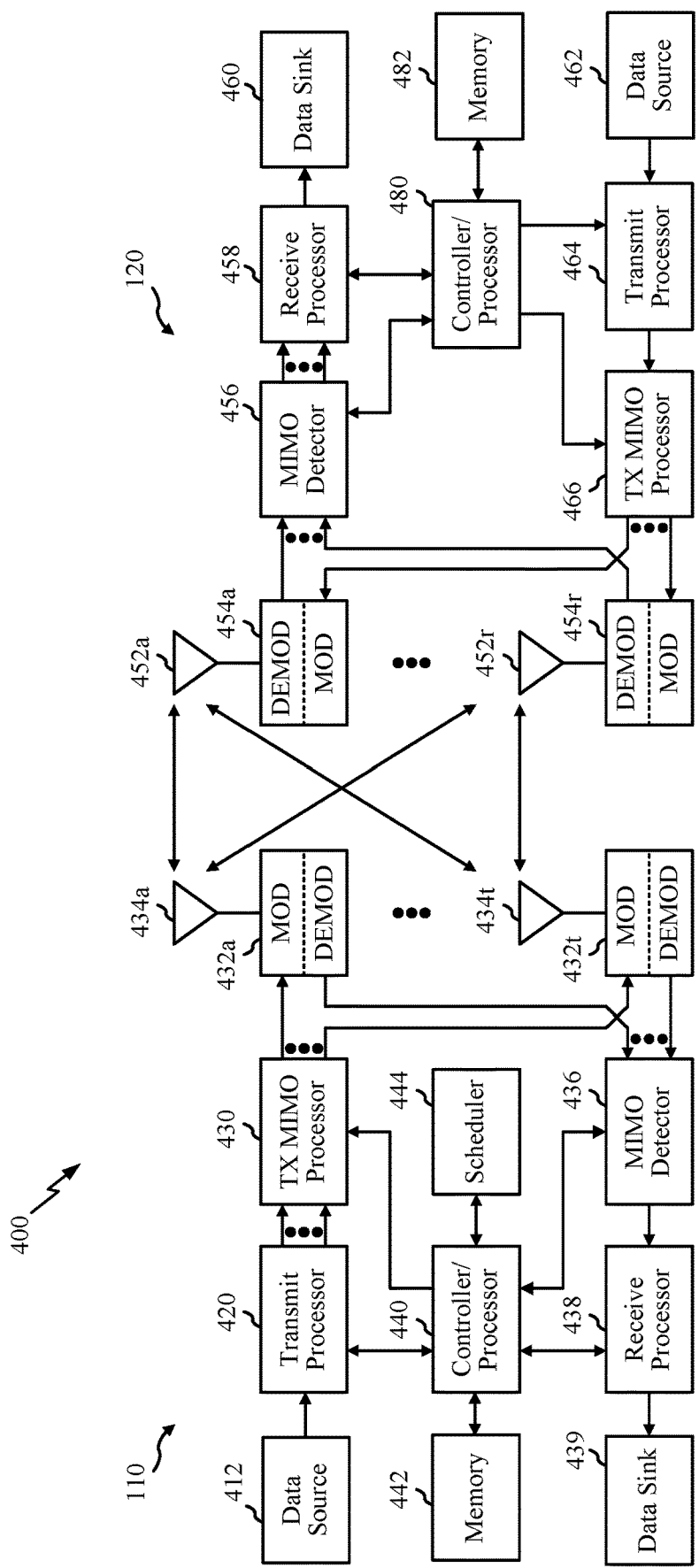
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 may perform (or be used to perform) operations 800 of FIG. 8. Similarly, antennas 434, processors 420, 430, 438, and/or controller/processor 440 of the BS 110 may perform (or be used to perform) operations 900 of FIG. 9.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, ... slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 5:
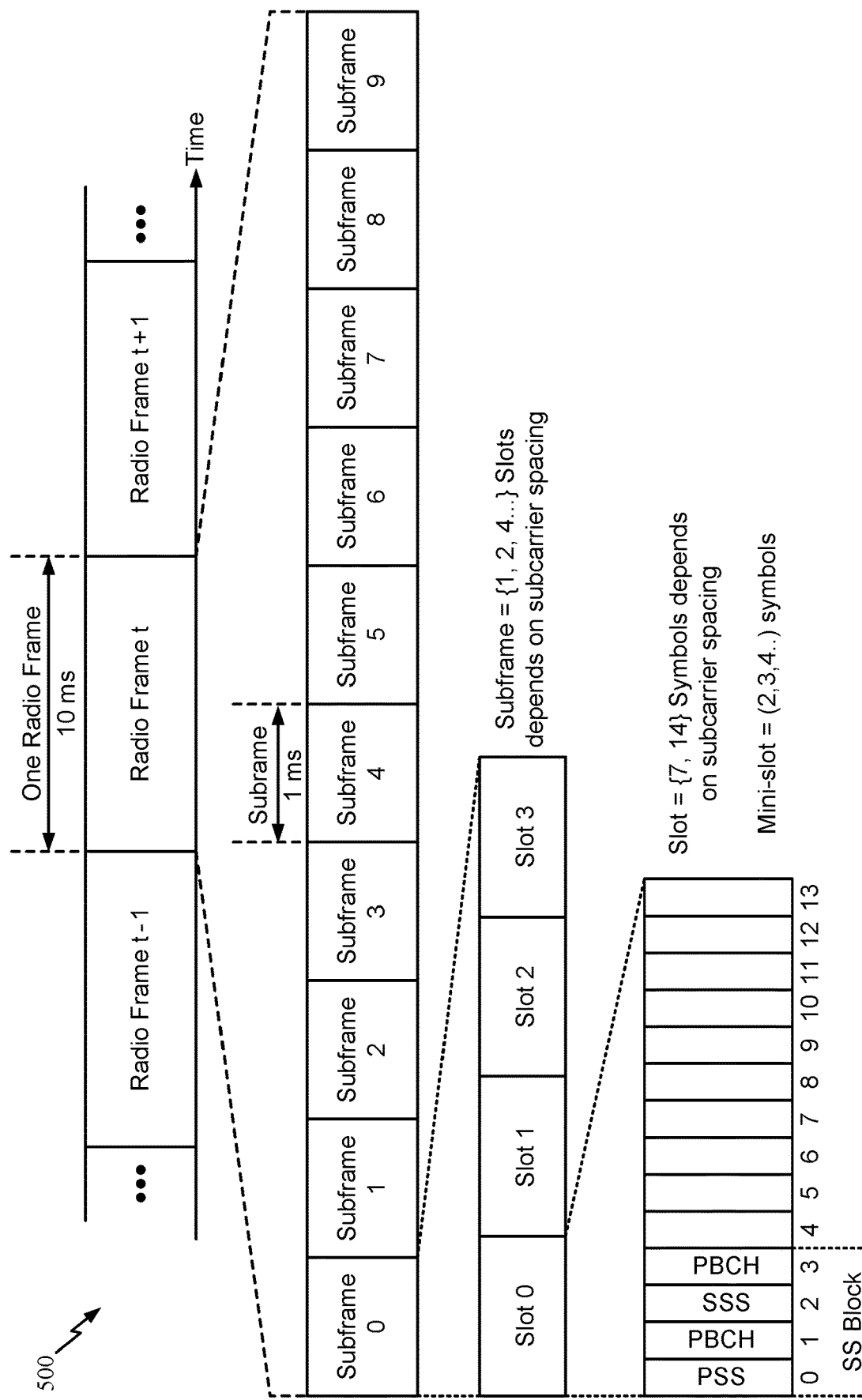
FIG. 5 is a diagram showing examples for implementing a communication protocol stack, in accordance with certain aspects of the present disclosure.

FIG. 5 is a diagram showing an example of a frame format 500 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 5. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Multi-TRP Scenarios

Figure 6:
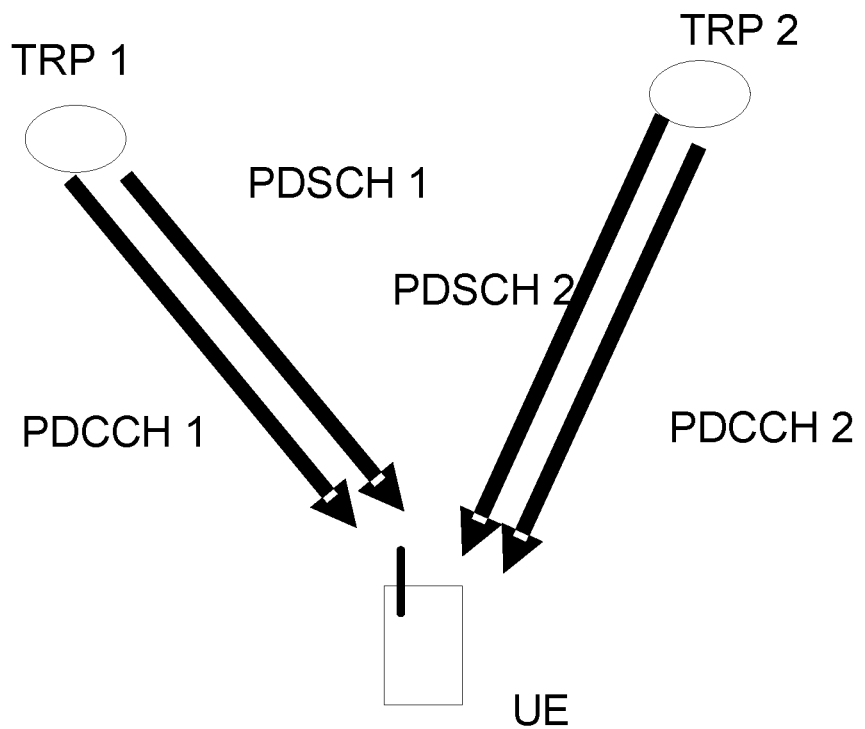
FIG. 6 illustrates a diagram illustrating an example multiple transmission reception point (TRP) transmission scenario, in accordance with certain aspects of the present disclosure.

NR networks are expected to utilize multiple transmission and reception points (TRPs) to improve reliability and capacity performance through flexible deployment scenarios. For example, allowing UEs to access wireless networks via multi-TRPs may help support increased mobile data traffic and enhance the coverage. Multi-TRPs may be used to implement one or more macro-cells, small cells, pico-cells, or femto-cells, and may include remote radio heads, relay nodes, and the like. FIG. 6 illustrates an example multi-TRP scenario, in which two TRPs (TRP 1 and TRP 2) serve a UE.

As illustrated in FIG. 6, for multi-TRP transmission, multiple PDCCHs (each transmitted from a different one of the multiple TRPs) may be used for scheduling. Each PDCCH may include corresponding downlink control information (DCI).

For example, PDCCH1 (transmitted from TRP 1) may carry a first DCI that schedules a first codeword (CW1) to be transmitted from TRP1 in PDSCH1. Similarly, PDCCH2 (transmitted from TRP2) may carry a second DCI that schedules a second codeword (CW2) to be transmitted from TRP2 in PDSCH2.

Figure 7:
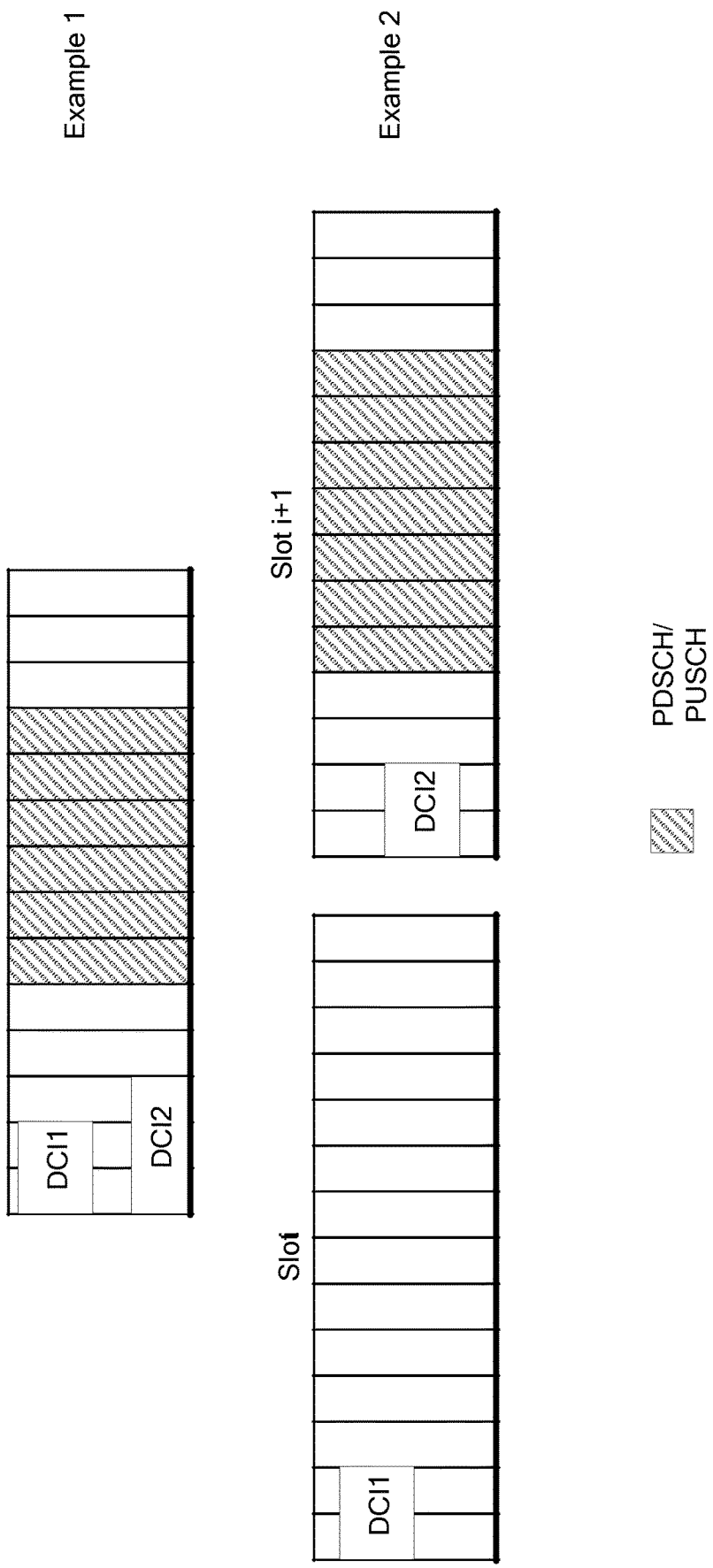
FIG. 7 is a block diagram illustrating an example of scheduling with repeated DCI, in accordance with certain aspects of the present disclosure.

In a 2-DCI based design multi-TRP transmission, such as that shown in FIG. 7, the backhaul (BH) condition for communication between the two TRPs can be ideal (relatively little BH latency) or non-ideal (substantial BH latency).

For monitoring the DCIs transmitted from different TRPs, a number of different control resource sets (CORESETs) may be used. As used herein, the term CORESET generally refers to a set of physical resources (e.g., a specific area on the NR Downlink Resource Grid) and a set of parameters that is used to carry PDCCH/DCI. For example, a CORESET may by similar in area to an LTE PDCCH area (e.g., the first 1,2,3,4 OFDM symbols in a subframe).

In some cases, TRP differentiation at the UE side may be based on CORESET groups. CORESET groups may be defined by higher layer signaling of an index per CORESET which can be used to group the CORESETs. For example, for 2 CORESET groups, two indexes may be used (i.e. index=0 and index=1). Thus, a UE may monitor for transmissions in different CORESET groups and infer that transmissions sent in different CORESET groups come from different TRPs. There may be other ways in which the notion of different TRPs may be transparent to the UE.

Example Pruning Rules for DCI Repetition

For enhancing the reliability of PDCCH transmissions (e.g., increase the likelihood of successful reception by a UE), repetition of DCI transmissions may be used for scheduling downlink or uplink transmissions, such as PDSCH or PUSCH. As used herein, the term repeated DCI refers to separate DCIs that indicate the same or similar scheduling information for the same PDSCH or PUSCH.

The repetition of DCI transmissions may improve reliability through diversity, by using resources and/or different transmission parameters (different precoders/beams/TCI states/TRPs/Panels).

In general, the repeated DCI may be processed separately with the focus on repetition without soft combining (without combining of log-likelihood ratios from different transmissions). In other words, it may be enough for the UE to at least decode one of the DCIs.

However, when both DCIs are decoded a UE may be faced with a decision on which DCI to use (e.g., to determine resources for a scheduled transmission). In such cases, aspects of the present disclosure provide pruning rules that may be employed by the UE so that the scheduling parameters for the scheduled transmission (PDSCH and/or PUSCH) can be unambiguously derived.

FIG. 7 illustrates two examples (labeled Example 1 and Example 2) of repeated DCI (where DCI2 is a repetition of DCI1). As illustrated in Example 1, DCI2 can come at the same time (in the same slot/symbols) as DCI1. Alternatively, the repeated DCI can come in different times (different slots/symbols). For example, DCI 1 can come in a first slot (Slot i) while DCI2 comes in the next slot (Slot i+1), as shown in Example 2. In both cases, however, both DCIs occur before the scheduled PDSCH/PUSCH transmission. Further, the repeated DCI can be in the same or different control resource set (CORESET or CORESET group)/search space set as the first DCI.

As alluded to above, even though the second DCI is referred to herein as a "repeated" DCI, in some cases the DCI fields of the two DCIs may not be entirely the same due to various factors. For example, if the DCI are sent on different slots, and hence, their scheduling delay (k0/k2) values (for pointing to the scheduled PDSCH/PUSCH transmissions) may be different in order to point to the same resources. The parameter k0 generally refers to the delay between a DL grant and the corresponding scheduled DL data (PDSCH) reception, while k2 generally refers to the delay between an UL grant reception in DL and the corresponding scheduled UL data (PUSCH) transmission.

Further, the repeated DCIs may be sent with different DCI formats, for example, DCI formats 1-0 and 1-1 (for DL) or DCI formats 0-0 and 0-1 (for UL). This may happen, for example, because they might be sent/received on different CORESETs, CORESET groups, and/or search space sets that are configured to monitor either fallback or non-fallback DCIs.

Aspects of the present disclosure provide techniques that may help a UE resolve ambiguity in determining scheduling parameters (e.g., and corresponding resources) for a transmission scheduled by repeated DCIs and/or for providing feedback for a transmission scheduled by repeated DCIs The techniques may effectively serve as "pruning rules" that a UE may apply to decide which DCI (of multiple/repeated DCI) to use when determining resources for a corresponding uplink or downlink transmission scheduled by the DCI.

As mentioned above, in one case, the DCI fields of the (two or more) repeated DCIs are exactly the same. In this case, a UE may simply ignore one of them if both DCIs are successfully decoded. In addition to all the fields being the same, the UE may still need to confirm that the two DCIs both relate to the same scheduled PDSCH/PUSCH transmission. This may work at least for UL DCI (DCI scheduling PUSCH). However, for DL DCI (DCI scheduling PDSCH), there might be some issues in various special cases as discussed below.

One issue for DL DCI is that even when the values of each DCI field are exactly the same for both DCIs, the PUCCH resource/configuration for transmitting uplink control information (UCI) with feedback (HARQ-Acknowledgment) may have dependency on other things (beyond the DCI field values).

For example, PUCCH resources may be indicated by a 3-bit PUCCH resource indicator (PRI) in the DCI. These 3 PRI bits can thus signal up to 8 possibilities for PUCCH resources within a PUCCH resource set. However, in some cases, this may be insufficient (e.g., even the same PRI value may not confirm the second DCI is a repetition).

As a first example of how PRI alone may be insufficient for resource determination, the first PUCCH resource set (out of the four sets) can contain up to 32 PUCCH resources (size of "resourceList" for the set can be larger than 8). In this case, the PRI alone is insufficient to determine the PUCCH resource (r_PUCCH) for HARQ-Acknowledgement transmission. Instead, r_PUCCH becomes a function of PRI, as well as the number of CCEs of the CORESET on which the DCI is received (which could be different if the two DCIs are received in different CORESETs or CORESET groups), and the index of the first CCE of the DCI reception (which could be different for the two DCIs even if they are in the same CORESET). It may be noted that the first set (out of four sets) may be chosen only when a payload of UCI is equal or smaller than 2 bits. There is no issue for the other 3 PUCCH sets, as these sets can have a maximum of 8 PUCCH resources (such that PRI alone is enough for resource determination).

A second example of how PRI alone may be insufficient for resource determination is if a UE does not have a dedicated PUCCH resource configuration (before RRC configures PUCCH resource set(s)). Similar to the first example, in this case, the set of possibilities is 16 (larger than 8), and the choice of PUCCH resource (r_PUCCH) becomes a function of PRI, the number of CCEs of the CORESET, and the index of the first CCE of the DCI reception.

Aspects of the present disclosure provide techniques that may help a UE resolve ambiguity in such cases when determining resources for a transmission scheduled by repeated DCIs and/or resources for providing feedback for a transmission scheduled by repeated DCIs).

Figure 8:
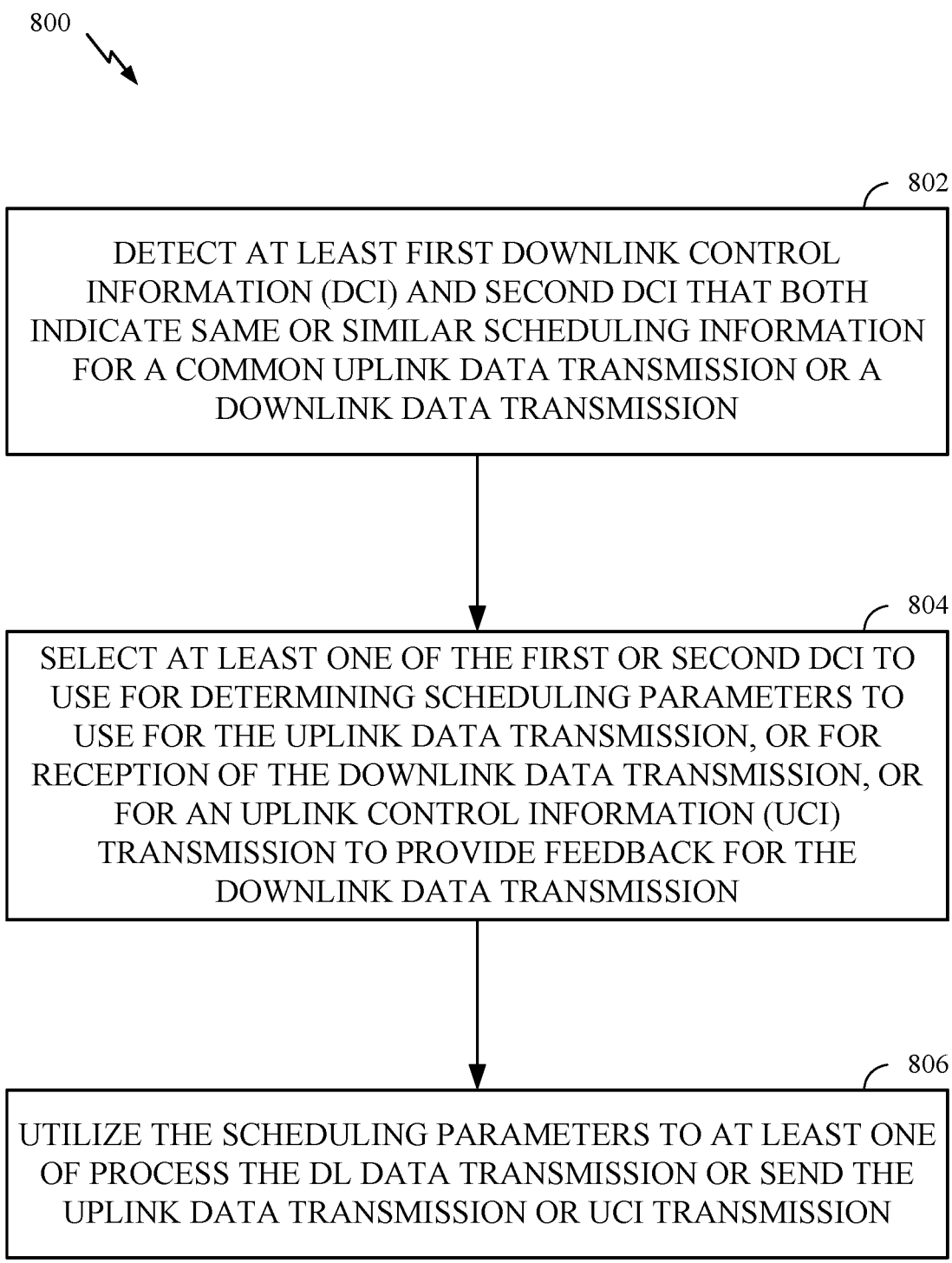
FIG. 8 is a flow diagram illustrating example operations that may be performed by a UE, in accordance with certain aspects of the present disclosure.

FIG. 8 is a flow diagram illustrating example operations 800 for wireless communications, in accordance with certain aspects of the present disclosure. The operations 800 may be performed, for example, by a UE (e.g., such as a UE 120 in the wireless communication network 100) for processing transmission scheduled with DCI repetition.

The operations 800 begin, at 802, by detecting at least first downlink control information (DCI) and second DCI that both indicate same or similar scheduling information for a common uplink data transmission or a downlink data transmission. As noted above, the repeated DCI could have exactly the same fields or could be different (e.g., if received in different time slots and/or sent using different transmit parameters).

At 804, the UE selects at least one of the first or second DCI to use for determining scheduling parameters to use for the uplink data transmission, or for reception of the downlink data transmission, or for an uplink control information (UCI) transmission to provide feedback for the downlink data transmission. As will be described in greater detail below, the selection may be based on various conditions. The scheduling parameters may include various parameters and may point to resources for reception of a DL transmission or resources to use for an uplink transmission. For a DL grant, the scheduling parameters may give scheduling information (e.g., indicate resources) for both DL data reception and UL control information (UCI) transmission. For an UL grant, the scheduling parameters may give scheduling information for UL data transmission.

At 806, the UE utilizes the scheduling parameters to at least one of process the DL data transmission or send the uplink data transmission or UCI transmission.

Figure 9:
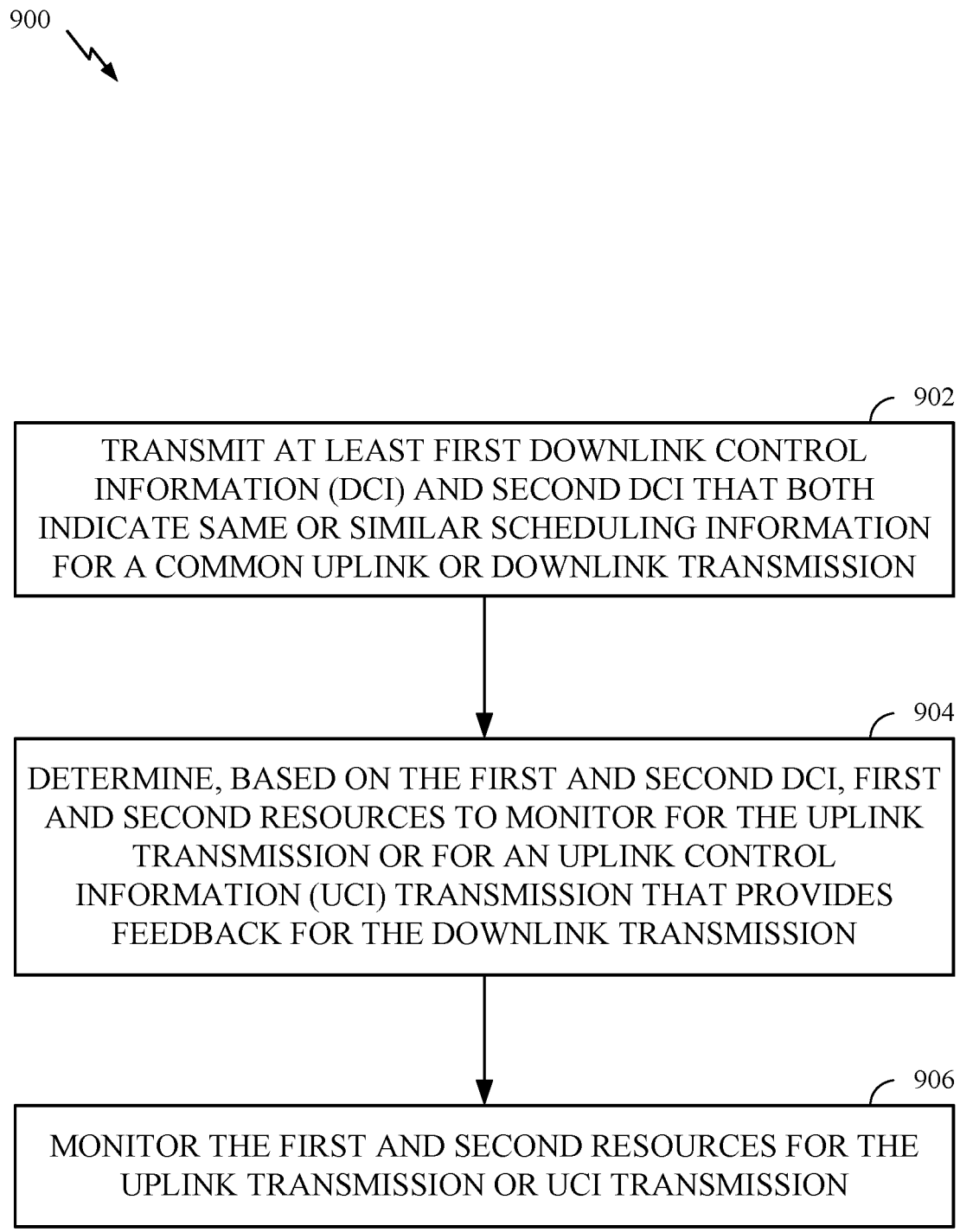
FIG. 9 is a flow diagram illustrating example operations that may be performed by a network entity, in accordance with certain aspects of the present disclosure.

FIG. 9 is a flow diagram illustrating example operations 900 for wireless communications, in accordance with certain aspects of the present disclosure. The operations 1200 may be performed, for example, by a network entity (e.g., such as a BS 110 in the wireless communication network 100) or TRP(s) for scheduling transmissions with DCI repetition.

The operations 900 begin, at 902, by transmitting at least first downlink control information (DCI) and second DCI that both indicate same or similar scheduling information for a common uplink or downlink transmission. Again, the repeated DCI could have exactly the same fields or could be different (e.g., if received in different time slots and/or sent using different transmit parameters).

At 904, the network entity determines, based on the first and second DCI, first and second resources to monitor for the uplink transmission or for an uplink control information (UCI) transmission that provides feedback for the downlink transmission. For example, with knowledge of the DCI parameters (e.g., PRI, the number of CCEs of the CORESET, and the index of the first CCE), the network entity may be able to determine r_PUCCH corresponding to each DCI.

At 906, the network entity monitors the first and second resources for the uplink transmission or UCI transmission. As will be described in greater detail below, the network entity may need to monitor both sets of resources as it does not know which DCI are successfully decoded by the UE.

For the case where the DCI fields are the same and the UE detects both DCIs, the UE may determine that conditions for one of the issues noted above exist. In such cases, the UE may select one of the DCI as the basis for resource determination. An advantage to the following options is that they each provide the UE a deterministic approach to selecting one of the DCIs.

For example, according to a first option, the UE may choose the DCI occurring in the later PDCCH monitoring occasion to use for determining scheduling parameters to use for the uplink data transmission, or for reception of the downlink data transmission. The UE may use the parameters of that DCI (e.g., number of CCEs of the CORESET, and index of the first CCE) of the last DCI as well as a PRI in the DCI to determine the PUCCH resources for HARQ-Acknowledgement feedback. If both DCIs occur in the same PDCCH monitoring occasion, the UE may select the DCI with the smaller or larger number of CCEs of the CORESETS and/or the DCI with the smaller or larger index of the first CCE (e.g., the first or last to occur).

According to a second option, the UE may calculate r_PUCCH separately according to parameters of each DCI, and chooses the DCI with the smaller or larger r_PUCCH (e.g., based on size or time of occurrence).

According to a third option, if DCIs are received in different CORESETs (which may be in different CORESET groups), a default CORESET (or CORESET group) can be used to determine the choice. For example, a CORESET with a smallest or largest CORESET ID (or CORESET group with the smallest or largest index) may be used to determine which DCI to use to determine r_PUCCH.

According to a fourth option, the UE may pick a DCI that was received with a higher confidence level. The confidence level may be determined as a function of one or more of: channel quality of the DMRS of the two DCIs, an aggregation level (AL) of the DCIs (e.g., based on a presumption transmission with a higher AL should result in a more reliable transmission), or log likelihood ratios (LLRs) of the two DCIs.

According to a fifth option, the UE may send PUCCH on both PUCCH resources (determined according to each DCI).

In either case, at the network side, since a network entity (e.g., gNB) does not know if both DCIs are decoded or only one of them is decoded, it may be required to monitor resources for both. In other words, the gNB may need to attempt to decode both hypotheses: one corresponding to PUCCH according to DCI1 and another according to PUCCH according to DCI2.

As noted above, there are various reasons why DCI fields of the two DCIs may not be exactly the same, but are both intended to schedule the same PDSCH/PUSCH transmission. The DCIs may have different k0 and/or k2 values due to the DCIs being transmitted in different slots, as shown in Example 2 of FIG. 7. DCI may be sent with different DCI formats, for example, DCI formats 1-0 and 1-1 (for DL) or DCI formats 0-0 and 0-1 (for UL).

Another reason why DCI fields may be different is, for DL, to allow a gNB to indicate two different PUCCH resources/parameters (e.g. two different beams) for transmission of HARQ-A for the PDSCH. Thus, the feedback received can be used as a mechanism to select parameters for future scheduled transmissions (e.g., choose a better beam on PUCCH depending on which beam is better for DCI). In other words, the resources selected for feedback may indicate which DCI is successfully decoded and/or has larger DMRS SINR. A gNB may then know (infer) which DCIs were detected successfully (based on which PUCCH parameters were used).

In the case when both DCIs are detected by a UE, the UE first needs to determine if the second DCI is a repetition. The determination can be at least based on one or more of the following conditions. One condition is that both DCI point to the same time/frequency domain resources (e.g., same slots, symbols, RBs) even though the corresponding DCI field values (time/freq. domain resource assignment fields) are not the same. Other possible conditions include that both DCIs have the same HARQ process ID, same (new date indicator) NDI value, same DCI identifier (determines DL or UL grant), same redundancy version (RV), same MCS, and/or same antenna port(s).

After UE determines that a second DCI was a repetition, the UE may then determine uplink resources. For the case where k0/k2 values are different, in principle, all the other values of DCI fields should also be the same. If this is the case, the UE may use either DCI. If this is not the case, the UE may still determine one of the DCI as valid for use in determining PUCCH resources, for example, based on any of the (five) options described above or, the UE may treat that as error case (and drop both).

For the case where DCIs are sent with different DCI formats, some fields may exist in only one of them (e.g. non-fallback DCI can have more fields than fallback DCI). In this case, the UE may still determine one of the DCI as valid for use in determining PUCCH resources, for example, based on any of the (five) options described above. For other fields that only exist in one of the DCIs, the UE may use the information from both DCIs when they are not conflicting, or the UE can ignore one of the DCIs completely and determine resources similar to the options described above.

For the case where the gNB may want to indicate two different PUCCH resources and/or parameters (e.g. two different beams) for transmission of HARQ-A for the PDSCH, the fields related to PUCCH parameters (e.g., k1, PRI, DAI) may be different. In this case, the UE may still determine one of the DCIs as valid for use in determining PUCCH resources, for example, based on any of the (five) options described above. In addition, since the value of k1 (the PDSCH-to-HARQ-timing-indicator field) can be different, an additional option could be to choose the DCI with larger or smaller k1 value. Of course, for these various cases, a combination of these conditions may apply.

For various cases described herein, the conditions to determine whether a DCI is a repetition (and hence the actions based on that determination) could also be more specific. For example, in addition to the described conditions, a DCI may be considered a repetition for purposes of applying the techniques described herein in certain cases. For example, a DCI may be considered a repetition only when the two DCIs are transmitted with different beams/TCI states/TRPs/Panels or are received on different UE panels. The UE can determine that this is the case, for example, based on QCL relationship for each DCI (e.g. if the two DCIs are received on two CORESETs with different TCI states). Applying this condition before a DCI is considered as a repetition may help effectively rule out performing additional processing to confirm the DCIs are repetitions in cases that might not be very useful.

Figure 10:
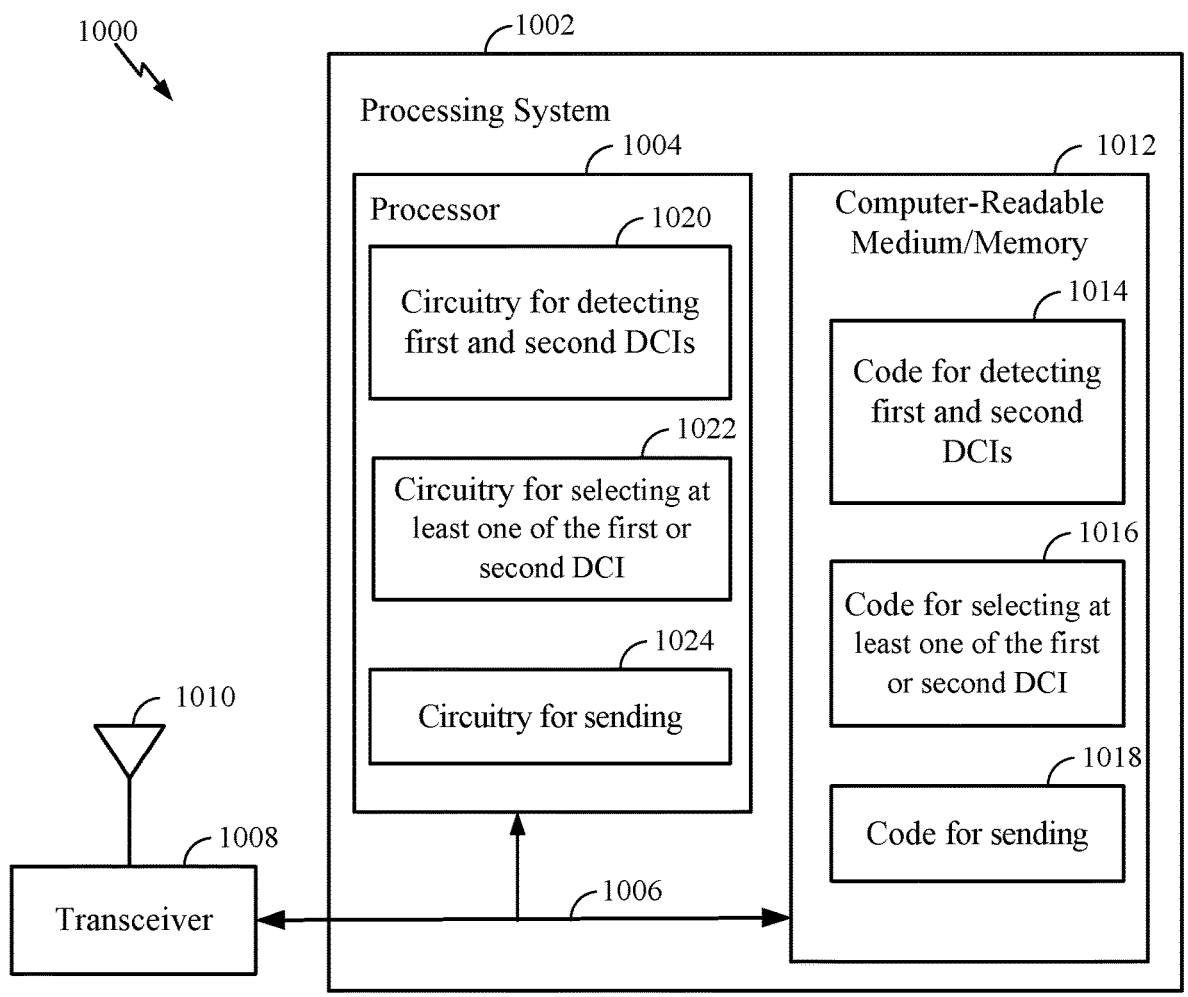
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 8. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer executable code) that when executed by the processor 1004, cause the processor 1004 to perform the operations illustrated in FIG. 8, or other operations for performing the various techniques discussed herein for processing repeated DCI transmissions. In certain aspects, computer-readable medium/memory 1012 stores code 1014 for detecting first and second DCI; code 1016 for selecting at least one of the first or second DCI to use for determining resources for an uplink transmission; and code 1018 for sending the uplink transmission. In certain aspects, the processor 1004 has circuitry configured to implement the code stored in the computer-readable medium/memory 1012. The processor 1004 includes circuitry 1020 for detecting first and second DCI; circuitry 1022 for selecting at least one of the first and second DCI for determining uplink resources; and circuitry 1024 for sending the uplink transmission.

Figure 11:
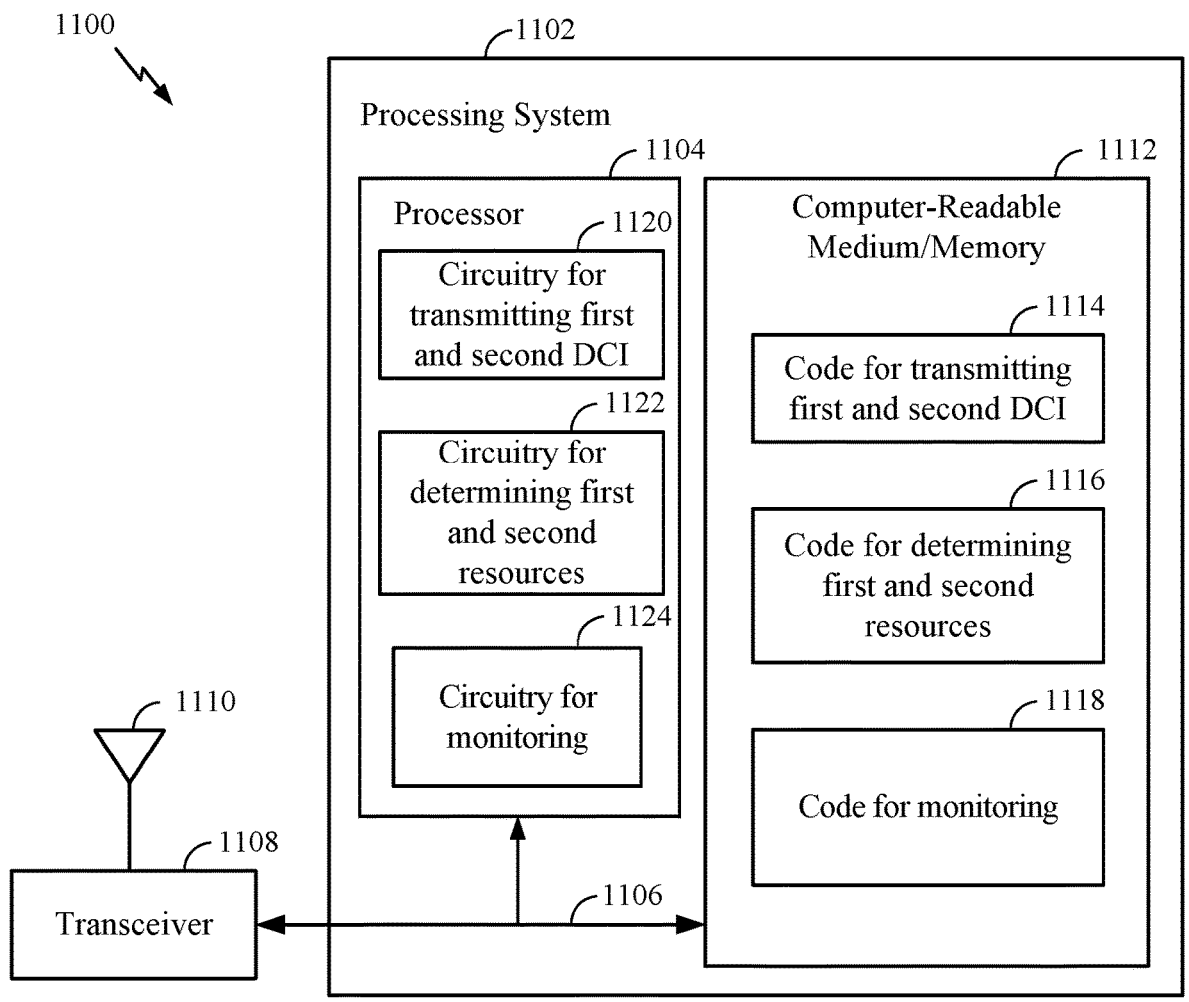
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 9. The communications device 1100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer executable code) that when executed by the processor 1104, cause the processor 1104 to perform the operations illustrated in FIG. 9, or other operations for performing the various techniques discussed herein for multi-TRP transmission. In certain aspects, computer-readable medium/memory 1112 stores code 1114 for transmitting first and second DCI; code 1116 for determining first and second resources to monitor for an uplink transmission; and code 1118 for monitoring the determined resources. In certain aspects, the processor 1104 has circuitry configured to implement the code stored in the computer-readable medium/memory 1112. The processor 1104 includes circuitry 1120 for transmitting first and second DCI; circuitry 1122 for determining first and second resources to monitor for an uplink transmission; and circuitry 1124 for monitoring the determined resources.

EXAMPLE ASPECTS

Aspect 1: A method for wireless communications by a user equipment (UE), comprising detecting at least first downlink control information (DCI) and second DCI that both indicate same or similar scheduling information for a common uplink data transmission or a downlink data transmission, selecting at least one of the first or second DCI to use for determining scheduling parameters to use for the uplink data transmission, or for reception of the downlink data transmission, or for an uplink control information (UCI) transmission to provide feedback for the downlink data transmission, and utilizing the scheduling parameters to at least one of process the DL data transmission or send the uplink data transmission or UCI transmission.

Aspect 2: The method of Aspect 1, wherein the DCIs are detected in different transmission time intervals (TTIs).

Aspect 3: The method of Aspect 2, wherein the DCIs span at least one of different time slots or symbols.

Aspect 4: The method of any of Aspects 1-3, wherein the UE determines the second DCI is a repetition of the first DCI if values of each field of the first and second DCIs are the same.

Aspect 5: The method of Aspect 4, wherein the determination is based on a PUCCH resource indicator (PRI) in the DCI and at least one of: a number of control channel elements (CCEs) of a control resource set (CORESET) that each DCI is received or an index of a first CCE of each DCI.

Aspect 6: The method of any of Aspects 1-5, wherein the selecting comprises selecting the first or second DCI that occurs in a later occurring physical downlink control channel (PDCCH) monitoring occasion.

Aspect 7: The method of any of Aspects 1-6, wherein the first and second DCI occur in a same physical downlink control channel (PDCCH) monitoring occasion and the selecting is based on at least one of: the number of control channel elements (CCEs) of a control resource set (CORESET) of each DCI or an index of a first CCE of each DCI.

Aspect 8: The method of any of Aspects 1-7, wherein the UE:
calculates a first index that points to resources for the uplink control transmission based on parameters of the first DCI and calculates a second index that points to resources for the uplink control transmission based on parameters of the second DCI and choosing an index to use for determining resources to use for the uplink control transmission based on a function of the first and second indices.

Aspect 9: The method of any of Aspects 1-8, wherein the first and second DCI are detected in different control resource sets (CORESETs), each CORESET in a different CORESET group and the first or second DCI is selected based on the CORESET group of its corresponding CORESET.

Aspect 10: The method of any of Aspects 1-9, wherein the first or second DCI is selected based on a corresponding detection confidence level.

Aspect 11: The method of Aspect 10, wherein the detection confidence level of each DCI is determined based on at least one of: channel quality of demodulation reference signals (DMRS), aggregation level (AL), or log likelihood ratio (LLR) values.

Aspect 12: The method of any of Aspects 1-11, wherein the UE determines different resources to use for the uplink transmission based on both the first and second DCI and the UE sends the uplink transmission using the different resources.

Aspect 13: The method of any of Aspects 1-12, wherein values of at least one field of the first and second DCIs are different and the UE is configured to determine the second DCI is a repetition of the first DCI based on one or more conditions.

Aspect 14: The method of Aspect 13, wherein the conditions comprise at least one of scheduling information for the first and second DCI both point to same time and frequency domain resources, the first and second DCI indicate at least one of a same hybrid automatic repeat request (HARQ) process ID, same NDI value, or same DCI identifier, or the first and second DCI have a same redundancy version (RV), modulation coding scheme (MCS), or antenna port.

Aspect 15: The method of any of Aspects 1-14, further comprising ignoring both DCI if scheduling information for the first and second DCI both point to same time and frequency domain resources and the first and second DCI indicate different hybrid automatic repeat request (HARD) process IDs or NDI values.

Aspect 16: The method of any of Aspects 1-15, wherein the UE uses information from both DCIs only when the information is not conflicting.

Aspect 17: The method of any of Aspects 1-16, wherein the UE is configured to select a DCI based on a value of a PDSCH-to-HARQ-timing indicator field.

Aspect 18: The method of any of Aspects 1-17, wherein the one or more conditions comprise at least one of determining the first and second DCIs are transmitted with different beams, transmission configuration indicator (TCI) states, transmission reception points (TRPs), or panels or determining the DCIs are received on different UE panels or received on different control resource sets (CORESETs) from different CORESET groups with different TCI states.

Aspect 19: A method for wireless communications by a network entity, comprising transmitting at least first downlink control information (DCI) and second DCI that both indicate same or similar scheduling information for a common uplink or downlink transmission, determining, based on the first and second DCI, first and second resources to monitor for the uplink transmission or for an uplink control information (UCI) transmission that provides feedback for the downlink transmission, and monitoring the first and second resources for the uplink transmission or UCI transmission.

Aspect 20: The method of Aspect 19, further comprising adjusting one or more transmission parameters based on the monitoring.

Aspect 21: The method of any of Aspects 19-20, wherein the first and second DCI are sent using different transmission parameters and the network entity selects transmission parameters used for the first or second DCI for subsequent transmissions, depending on which of the first or second resources the uplink transmission or UCI transmission is detected.

Aspect 22: The method of Aspect 21, wherein the first and second DCI are sent using different beams and the network entity selects a beam based on which of the first or second resources the uplink transmission or UCI transmission is detected.

Aspect 23: An apparatus for wireless communications by a user equipment (UE), comprising means for detecting at least first downlink control information (DCI) and second DCI that both indicate same or similar scheduling information for a common uplink data transmission or a downlink data transmission, means for selecting at least one of the first or second DCI to use for determining scheduling parameters to use for the uplink data transmission, or for reception of the downlink data transmission, or for an uplink control information (UCI) transmission to provide feedback for the downlink data transmission, and means for utilizing the scheduling parameters to at least one of process the DL data transmission or send the uplink data transmission or UCI transmission.

Aspect 24: An apparatus for wireless communications by a network entity, comprising means for transmitting at least first downlink control information (DCI) and second DCI that both indicate same or similar scheduling information for a common uplink or downlink transmission, means for determining, based on the first and second DCI, first and second resources to monitor for the uplink transmission or for an uplink control information (UCI) transmission that provides feedback for the downlink transmission, and means for monitoring the first and second resources for the uplink transmission or UCI transmission.

Aspect 25: An apparatus for wireless communications by a user equipment (UE), comprising at least one processor configured to: detect at least first downlink control information (DCI) and second DCI that both indicate same or similar scheduling information for a common uplink data transmission or a downlink data transmission, select at least one of the first or second DCI to use for determining scheduling parameters to use for the uplink data transmission, or for reception of the downlink data transmission, or for an uplink control information (UCI) transmission to provide feedback for the downlink data transmission, and utilize the scheduling parameters to at least one of process the DL data transmission or send the uplink data transmission or UCI transmission; and a memory coupled with the at least one processor.

Aspect 26: An apparatus for wireless communications by a network entity, comprising at least one processor configured to: transmit at least first downlink control information (DCI) and second DCI that both indicate same or similar scheduling information for a common uplink or downlink transmission, determine, based on the first and second DCI, first and second resources to monitor for the uplink transmission or for an uplink control information (UCI) transmission that provides feedback for the downlink transmission, and monitor the first and second resources for the uplink transmission or UCI transmission; and a memory coupled with the at least one processor.

Aspect 27: A computer readable medium having instructions stored thereon for detecting at least first downlink control information (DCI) and second DCI that both indicate same or similar scheduling information for a common uplink data transmission or a downlink data transmission, selecting at least one of the first or second DCI to use for determining scheduling parameters to use for the uplink data transmission, or for reception of the downlink data transmission, or for an uplink control information (UCI) transmission to provide feedback for the downlink data transmission, and utilizing the scheduling parameters to at least one of process the DL data transmission or send the uplink data transmission or UCI transmission.

Aspect 28: A computer readable medium having instructions stored thereon for transmitting at least first downlink control information (DCI) and second DCI that both indicate same or similar scheduling information for a common uplink or downlink transmission, determining, based on the first and second DCI, first and second resources to monitor for the uplink transmission or for an uplink control information (UCI) transmission that provides feedback for the downlink transmission, and monitoring the first and second resources for the uplink transmission or UCI transmission.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 8, and/or FIG. 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   detecting at least first downlink control information (DCI) and second DCI, wherein:
      the second DCI is a repetition of the first DCI, and
      the first and second DCI both indicate same scheduling information for a common uplink data transmission or a downlink data transmission;
   selecting at least one of the first or second DCI to use for determining parameters to use for the uplink data transmission, or for reception of the downlink data transmission; and
   processing the DL data transmission or sending the uplink data transmission based on the determined parameters.

2. The method of claim 1, wherein the first and second DCIs span at least one of different time slots or symbols.

3. The method of claim 1, wherein:
   the first DCI and the second DCI occur in a same physical downlink control channel (PDCCH) monitoring occasion; and
   the selecting is based on an index of a first CCE of each DCI.

4. The method of claim 1, wherein the DCIs are detected in different transmission time intervals (TTIs).

5. The method of claim 1, wherein the selecting comprises selecting the first or second DCI that occurs in a later occurring physical downlink control channel (PDCCH) monitoring occasion.

6. The method of claim 1, wherein the UE:
   calculates a first index that points to resources for the uplink control transmission based on parameters of the first DCI;
   calculates a second index that points to resources for the uplink control transmission based on parameters of the second DCI; and
   choosing an index to use for determining resources to use for the uplink control transmission based on a function of the first index and the second index.

7. The method of claim 1, wherein:
   the first and second DCI are detected in different CORESETs, each CORESET in a different CORESET group; and
   the first or second DCI is selected based on the CORESET group of its corresponding CORESET.

8. The method of claim 1, wherein:
   the first or second DCI is selected based on a corresponding detection confidence level.

9. The method of claim 8, wherein the detection confidence level of each DCI is determined based on at least one of: channel quality of demodulation reference signals (DMRS), aggregation level (AL), or log likelihood ratio (LLR) values.

10. The method of claim 1, wherein:
    the UE determines different resources to use for the uplink transmission based on both the first and second DCI; and
    the UE sends the uplink transmission using the different resources.

11. The method of claim 1, wherein:
    values of at least one field of the first and second DCIs are different; and
    the UE is configured to determine the second DCI is a repetition of the first DCI based on one or more conditions.

12. The method of claim 11, wherein the conditions comprise at least one of:
    scheduling information for the first and second DCI both point to same time and frequency domain resources;
    the first and second DCI indicate at least one of a same hybrid automatic repeat request (HARQ) process ID, same NDI value, or same DCI identifier; or
    the first and second DCI have a same redundancy version (RV), modulation coding scheme (MCS), or antenna port.

13. The method of claim 11, further comprising ignoring both DCI if:
    scheduling information for the first and second DCI both point to same time and frequency domain resources; and
    the first and second DCI indicate different hybrid automatic repeat request (HARQ) process IDs or NDI values.

14. The method of claim 11, wherein the UE uses information from both DCIs only when the information is not conflicting.

15. The method of claim 11, wherein the UE is configured to select a DCI based on a value of a PDSCH-to-HARQ-timing indicator field.

16. The method of claim 11, wherein the one or more conditions comprise at least one of:
    determining the first and second DCIs are transmitted with different beams, transmission configuration indicator (TCI) states, transmission reception points (TRPs), or panels; or
    determining the DCIs are received on different UE panels or received on different CORESETs from different CORESET groups with different TCI states.

17. The method of claim 1, wherein the same scheduling information comprises similar scheduling information.

18. An apparatus for wireless communications by a user equipment (UE), comprising:

at least one memory having executable instructions stored thereon; and one or more processors configured, individually or in any combination, to execute the executable instructions to cause the apparatus to:

detect at least first downlink control information (DCI) and second DCI, wherein:
the second DCI is a repetition of the first DCI, and
the first and second DCI both indicate same scheduling information for a common uplink data transmission or a downlink data transmission;

select at least one of the first or second DCI to use for determining parameters to use for the uplink data transmission, or for reception of the downlink data transmission; and process the DL data transmission or sending the uplink data transmission based on the determined parameters.

19. The apparatus of claim 18, wherein the first and second DCIs span at least one of different time slots or symbols.

20. The apparatus of claim 18, wherein:
the first DCI and the second DCI occur in a same physical downlink control channel (PDCCH) monitoring occasion; and
the selecting is based on an index of a first CCE of each DCI.

21. The apparatus of claim 18, wherein the DCIs are detected in different transmission time intervals (TTIs).

22. The apparatus of claim 18, wherein to select at least one of the first or second DCI, the one or more processors, individually or in any combination, are configured to cause the apparatus to select the first or second DCI that occurs in a later occurring physical downlink control channel (PDCCH) monitoring occasion.

23. The apparatus of claim 18, wherein the one or more processors, individually or in any combination, are configured to cause the apparatus to:
calculate a first index that points to resources for the uplink control transmission based on parameters of the first DCI;
calculate a second index that points to resources for the uplink control transmission based on parameters of the second DCI; and
choose an index to use for determining resources to use for the uplink control transmission based on a function of the first index and the second index.

24. The apparatus of claim 18, wherein:
the first and second DCI are detected in different CORESETs, each CORESET in a different CORESET group; and
the first or second DCI is selected based on the CORESET group of its corresponding CORESET.

25. The apparatus of claim 18, wherein:
values of at least one field of the first and second DCIs are different; and
the apparatus is configured to determine the second DCI is a repetition of the first DCI based on one or more conditions.

26. The apparatus of claim 25, wherein the conditions comprise at least one of:
scheduling information for the first and second DCI both point to same time and frequency domain resources;
the first and second DCI indicate at least one of a same hybrid automatic repeat request (HARQ) process ID, same NDI value, or same DCI identifier; or
the first and second DCI have a same redundancy version (RV), modulation coding scheme (MCS), or antenna port.

27. The apparatus of claim 25, further comprising ignoring both DCI if:
scheduling information for the first and second DCI both point to same time and frequency domain resources; and
the first and second DCI indicate different hybrid automatic repeat request (HARQ) process IDs or NDI values.

28. The apparatus of claim 25, wherein the apparatus is configured to select a DCI based on a value of a PDSCH-to-HARQ-timing indicator field.

29. The apparatus of claim 25, wherein the one or more conditions comprise at least one of:
determining the first and second DCIs are transmitted with different beams, transmission configuration indicator (TCI) states, transmission reception points (TRPs), or panels; or
determining the DCIs are received on different UE panels or received on different CORESETs from different CORESET groups with different TCI states.

* * * * *